(12) United States Patent
Seipold et al.

(10) Patent No.: US 12,601,581 B2
(45) Date of Patent: Apr. 14, 2026

(54) GENERATOR ROTOR CENTERING DEVICE

(71) Applicant: Caterpillar Inc., Peoria, IL (US)

(72) Inventors: John Seipold, Peoria, IL (US); Lucas Peterson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1048 days.

(21) Appl. No.: 17/671,360

(22) Filed: Feb. 14, 2022

(65) Prior Publication Data

US 2023/0258444 A1     Aug. 17, 2023

(51) Int. Cl.
*G01B 5/25* (2006.01)
*G01B 5/00* (2006.01)

(52) U.S. Cl.
CPC ............. *G01B 5/25* (2013.01); *G01B 5/0002* (2013.01)

(58) Field of Classification Search
CPC ......... G01B 5/25; G01B 5/0002; Y02E 10/72; F16D 1/04; F16D 1/033
See application file for complete search history.

(56) References Cited

U.S. PATENT DOCUMENTS

| | | | | |
|---|---|---|---|---|
| 2,007,897 A | * | 7/1935 | Skeel | F16D 3/36 464/142 |
| 2,638,676 A | | 5/1953 | Callahan | |
| 2,862,728 A | * | 12/1958 | Druschel | H01P 1/042 285/24 |

| | | | | |
|---|---|---|---|---|
| 4,033,701 A | * | 7/1977 | Labyer | F16J 1/12 403/338 |
| 4,161,068 A | | 7/1979 | Mcmaster | |
| 4,175,405 A | | 11/1979 | Smith et al. | |
| 4,376,592 A | * | 3/1983 | Martinek | A22C 13/02 403/26 |
| 4,391,458 A | * | 7/1983 | Blakeley | F16L 41/12 285/112 |
| 4,516,328 A | * | 5/1985 | Massey | F16D 1/02 33/645 |
| 4,534,114 A | * | 8/1985 | Woyton | G01B 5/25 33/645 |
| 5,303,681 A | * | 4/1994 | Crofts | F16D 3/58 123/192.1 |
| 5,333,963 A | | 8/1994 | Blumentrath | |
| 5,479,718 A | | 1/1996 | Cook | |

(Continued)

FOREIGN PATENT DOCUMENTS

| | | | | |
|---|---|---|---|---|
| CN | 206190763 U | | 5/2017 | |
| CN | 110605937 B | * | 8/2024 | ........... B60B 27/001 |

(Continued)

OTHER PUBLICATIONS

Written Opinion and International Search Report for Int'l. Patent Appln. No. PCT/US2023/061055, mailed Apr. 28, 2023 (10 pgs).

*Primary Examiner* — Yaritza Guadalupe-McCall

(57) ABSTRACT

A centering device for centering a rotor shaft of a generator to a gearbox shaft of a gearbox in a genset assembly is disclosed. The centering device comprises a clamp assembly configured to be oriented on the rotor shaft and the gearbox shaft wherein the clamp assembly is further configured to be tightened to force the rotor shaft to coaxially align with the gearbox shaft. A method of using the centering device in a genset assembly to coaxially align the gearbox shaft with the rotor shaft of a generator is disclosed.

18 Claims, 7 Drawing Sheets

(56) References Cited

U.S. PATENT DOCUMENTS

| | | | | |
|---|---|---|---|---|
| 5,582,489 | A | 12/1996 | Marzio et al. | |
| 5,665,001 | A * | 9/1997 | Jacob | F16L 19/02 |
| | | | | 464/182 |
| 6,086,479 | A * | 7/2000 | Khariton | F16C 23/00 |
| | | | | 464/179 |
| 6,135,726 | A * | 10/2000 | Robertson | F01C 21/007 |
| | | | | 417/363 |
| 7,411,310 | B2 * | 8/2008 | Hollinger | H02K 7/1815 |
| | | | | 290/45 |
| 7,753,614 | B2 | 7/2010 | Kobayashi | |
| 8,100,601 | B2 * | 1/2012 | Pietsch | A01F 29/14 |
| | | | | 241/35 |
| 8,196,304 | B1 * | 6/2012 | McBride | F16H 25/20 |
| | | | | 33/645 |
| 8,307,801 | B2 * | 11/2012 | Oilar | H02K 7/02 |
| | | | | 123/149 D |
| 8,745,888 | B2 * | 6/2014 | Silliman | G01N 29/2437 |
| | | | | 73/632 |
| 8,757,918 | B2 * | 6/2014 | Ramnarain | F04B 17/03 |
| | | | | 403/DIG. 4 |
| 9,038,281 | B1 * | 5/2015 | McBride | G01B 11/272 |
| | | | | 33/613 |
| 9,759,265 | B2 * | 9/2017 | Bodtker | F16D 3/207 |
| 9,879,973 | B2 * | 1/2018 | Boisson | G01B 7/31 |
| 9,964,394 | B2 * | 5/2018 | Andersson | G01B 5/25 |
| 10,077,799 | B2 * | 9/2018 | Wilhelm | F16C 3/12 |
| 10,823,137 | B2 * | 11/2020 | Gomez | F03D 7/0224 |
| 11,088,015 | B2 | 8/2021 | Halpin | |
| 12,366,282 | B2 * | 7/2025 | Schillinger | F16H 57/033 |
| 2006/0140713 | A1 * | 6/2006 | Kobayashi | F16D 1/033 |
| | | | | 403/321 |
| 2009/0279946 | A1 | 11/2009 | Wingett et al. | |
| 2015/0016878 | A1 | 1/2015 | Isaacson | |
| 2019/0063400 | A1 * | 2/2019 | Gomez | F03D 80/70 |
| 2023/0258444 | A1 * | 8/2023 | Seipold | F16D 1/04 |
| | | | | 33/645 |

FOREIGN PATENT DOCUMENTS

| | | | | |
|---|---|---|---|---|
| DE | 102007028873 | B4 * | 12/2010 | F16D 1/033 |
| EP | 1118787 | B1 * | 3/2004 | F16D 23/06 |
| GB | 2226869 | A | 7/1990 | |
| JP | 4781239 | B2 | 9/2011 | |
| JP | 2019173845 | A | 10/2019 | |
| WO | WO-2021099035 | A1 * | 5/2021 | H02K 7/003 |

* cited by examiner

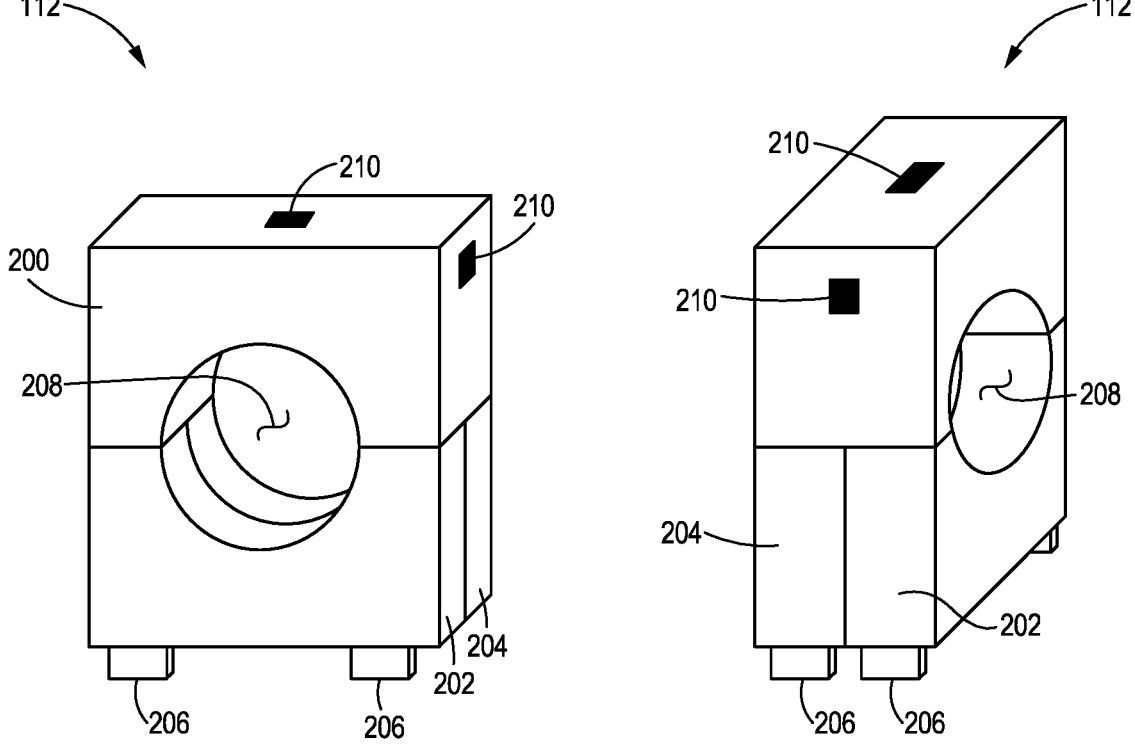
FIG. 2            FIG. 3

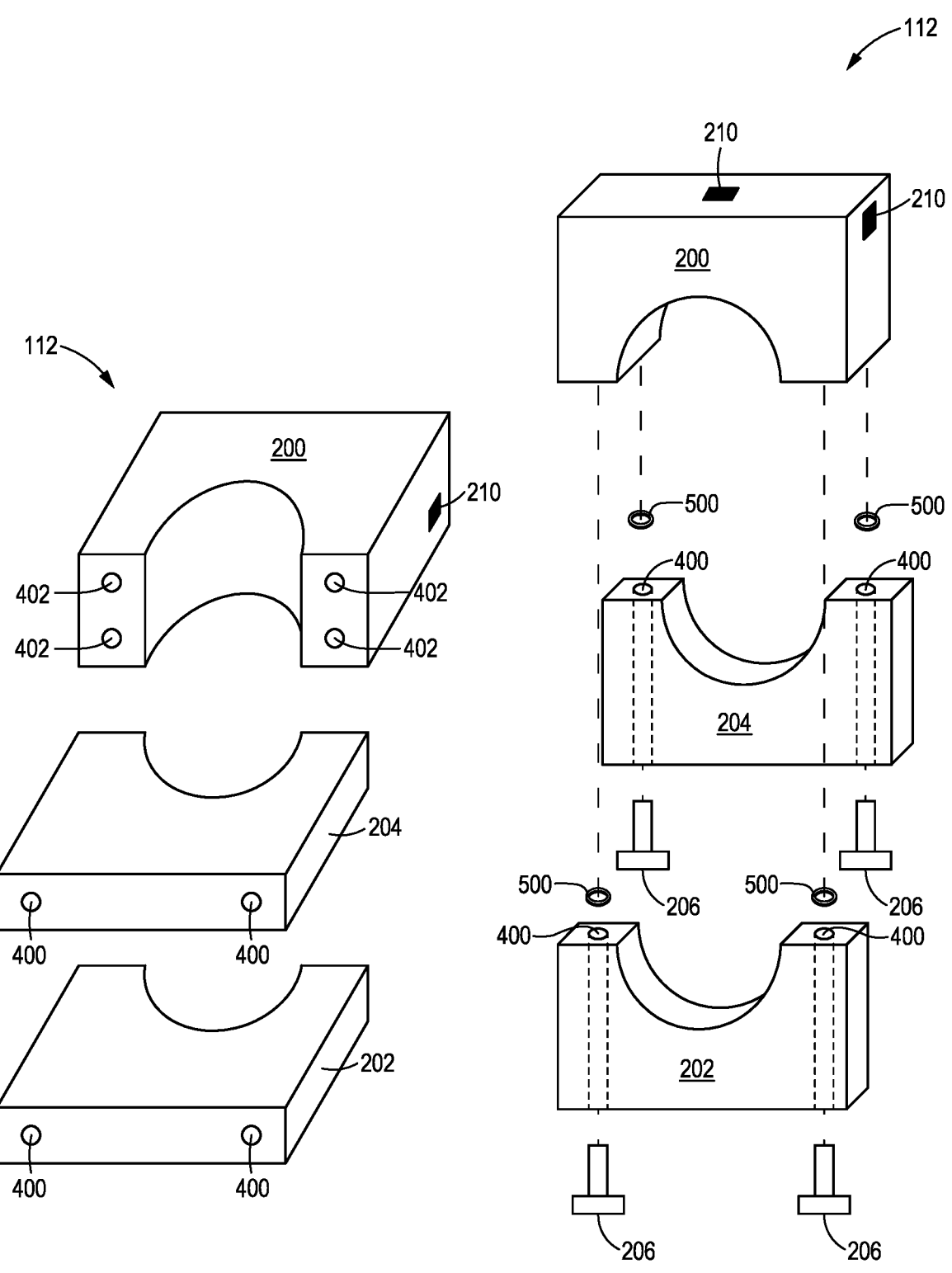
FIG. 4                    FIG. 5

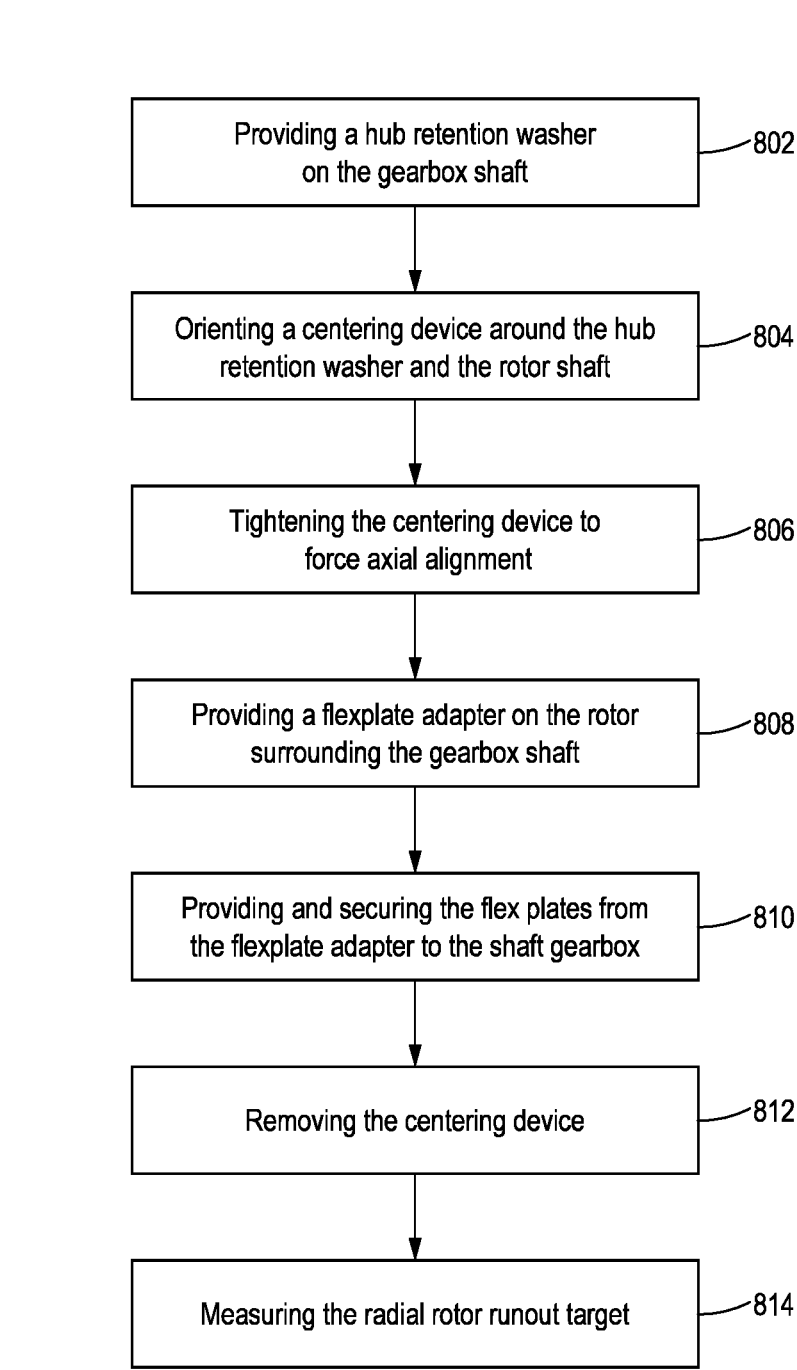

800

| Providing a hub retention washer on the gearbox shaft | 802 |

↓

| Orienting a centering device around the hub retention washer and the rotor shaft | 804 |

↓

| Tightening the centering device to force axial alignment | 806 |

↓

| Providing a flexplate adapter on the rotor surrounding the gearbox shaft | 808 |

↓

| Providing and securing the flex plates from the flexplate adapter to the shaft gearbox | 810 |

↓

| Removing the centering device | 812 |

↓

| Measuring the radial rotor runout target | 814 |

*FIG. 8*

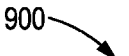
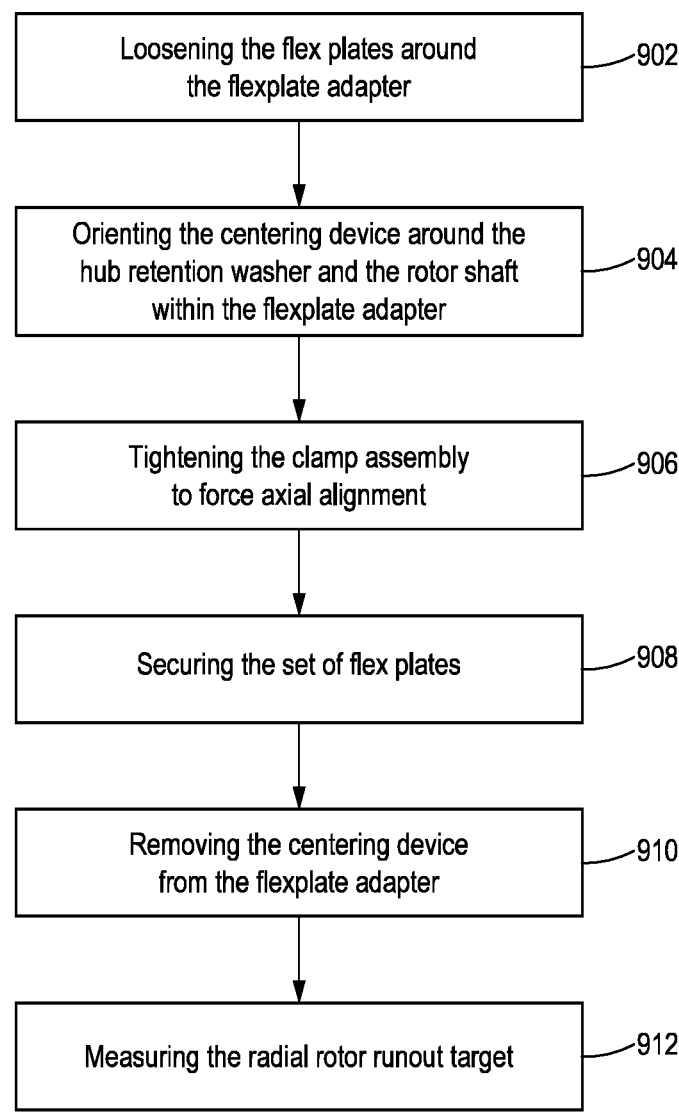
| Loosening the flex plates around the flexplate adapter | 902 |
| Orienting the centering device around the hub retention washer and the rotor shaft within the flexplate adapter | 904 |
| Tightening the clamp assembly to force axial alignment | 906 |
| Securing the set of flex plates | 908 |
| Removing the centering device from the flexplate adapter | 910 |
| Measuring the radial rotor runout target | 912 |
*FIG. 9*

GENERATOR ROTOR CENTERING DEVICE

TECHNICAL FIELD

The present disclosure generally relates to a centering device and method of coaxially aligning a generator rotor shaft and a gearbox shaft associated with a genset assembly.

BACKGROUND

When connecting the rotary shafts of a generator or motor and the rotating shafts of gearboxes or operating equipment, it is extremely important to align the shafts accurately with tight tolerances. Inaccurate alignment of the shafts may result in bearing damage, excessive wear, excessive vibrations, damage to the shafts, and potential damage to the generator. Maintaining alignment during operation is equally important.

In an attempt to overcome such problems and provide accurate alignment between coupled shafts, alignment devices have been developed and utilized, with varying degrees of efficiency and success. The prior art has achieved varying degrees of shaft alignment but require a pair or more of centering mechanisms for horizontal and/or vertical shaft alignment during assembly and aftermarket repair. For example, U.S. Pat. No. 4,516,328 to Massey, discloses a shaft alignment device comprising a pair of opposing adjustable clamping members, each being attached to the outside diameters of the shafts or axles to be aligned. A tubular, telescoping indicator holder extends outwardly from each clamping member. A dial indicator gauge is mounted on a rod projecting upwardly from the extended end of each indicator holder. The top surface of the clamping members are machined to a radius whereby rotating them 180° from each other forms an indicating circle which is read by the dial gauge mounted on the opposing indicator holder. The clamping members are secured in position on the shafts to be aligned with telescoping supports extending toward each other and offset so that the gauge is positioned on the support. The horizontal and vertical offsets of the shafts are then adjusted as indicated by the gauge.

During assembly of a generator to gearbox, a simpler mechanism is needed to accurately center a single bearing rotor shaft to the supporting gearbox shaft without measurements by a gauge or other measuring device during assembly and aftermarket repair. The prior art fails to disclose the present invention which is simple to manufacture, easy to use during assembly and repair.

SUMMARY OF THE DISCLOSURE

The present disclosure provides, in one embodiment, a centering device for centering a rotor shaft of a generator to a gearbox shaft of a gearbox is disclosed. The centering device comprises a clamp assembly configured to be oriented on the rotor shaft and the gearbox shaft. The centering device also comprising an at least one alignment bolt configured to tighten and secure the clamp assembly around the rotor shaft and the gearbox shaft to force coaxial alignment.

In another embodiment, a genset assembly is disclosed. The genset assembly comprises a generator comprising a rotor, a gearbox comprising a gearbox shaft, a hub retention washer connected to the gearbox shaft, and a centering device. The rotor is operatively coupled to rotate with the gearbox shaft, and the centering device is configured to be oriented around the rotor and the hub retention washer to axially align the rotor shaft and gearbox shaft during assembly.

In another embodiment, a method of using the centering device is disclosed. The centering device comprises a clamp assembly configured to be tightened to force radial alignment of a rotor shaft of a generator to a gearbox shaft of a gearbox. The method steps include providing a hub retention washer connected to the gearbox shaft and the hub retention washer comprising a protruding diameter matching a front of the rotor shaft. The centering device is then oriented around the hub retention washer and the rotor shaft, whereby tightening the clamp assembly provides a centering force that coaxially and radially aligns the rotor and gearbox shaft.

These and other aspects and features of the present disclosure will be better understood upon reading the following detailed description when read in conjunction with the accompanying drawings.

BRIEF DESCRIPTION OF THE DRAWINGS

FIG. 2 is a perspective frontal view of the centering device, according to an embodiment.

FIG. 3 is a perspective side view of the centering device, according to an embodiment.

FIG. 4 is a perspective side view of the parts of the centering device, according to an embodiment.

FIG. 5 is an explosive view of the centering device in an upright position, according to an embodiment.

FIG. 8 is a flow chart depicting a sample sequence of steps that may be conducted in accordance with the method of the present disclosure.

FIG. 9 is a flow chart depicting a sample sequence of steps that may be conducted in accordance with the repair method of the present disclosure.

The figures depict one embodiment of the presented invention for purposes of illustration only. One skilled in the art will readily recognize from the following discussion that alternative embodiments of the structures and methods illustrated herein may be employed without departing from the principles described herein.

DETAILED DESCRIPTION

Figure 1:
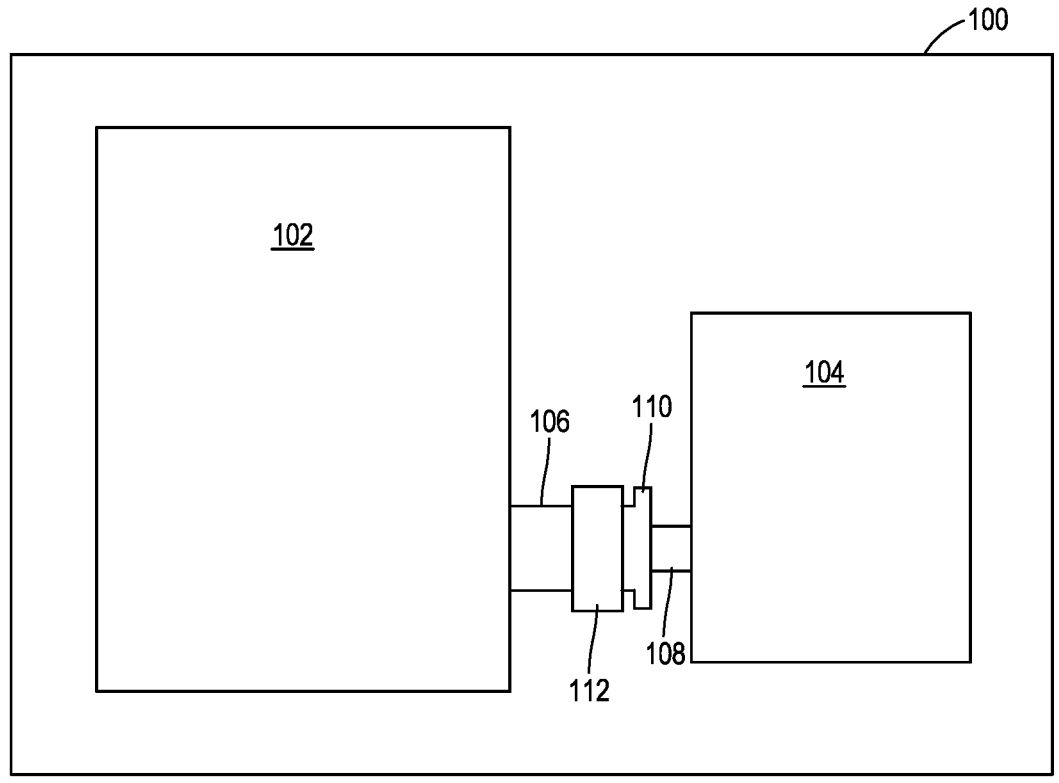
FIG. 1 is a schematic view of the centering device in position in a genset assembly, according to an embodiment.

Referring now to the drawings, and with specific reference to FIG. 1, an exemplary genset assembly 100 is illustrated. The genset assembly 100 may include a generator 102 and a gearbox 104. The generator 102 itself may include a rotor 106 coupled to a gearbox shaft 108 of the gearbox 104. The rotor 106 is operatively coupled to rotate with the gearbox shaft 108. The genset assembly 100 may be electrical or gas powered and the generator 102 may be a single bearing generator.

In one embodiment, the gearbox shaft 108 further comprises a hub retention washer 110. The hub retention washer 110 is configured to have a protruding diameter that matches the front of the rotor 106. The genset assembly 100 further comprising a centering device 112 configured to orient around the hub retention washer 110 and the rotor 106 to axially align the rotor 106 and gearbox shaft 108 to avoid damaging the genset assembly 100.

The genset assembly 100 may be damaged if the axial alignment of the rotor 106 and the gearbox shaft 108 is greater than a certain radial rotor runout target. When coupling a single bearing generator to a gearbox 104, there is potential for large radial rotor runout to occur due to minimum material conditions and tolerances of flex plates, flex plate adapters, and system tolerance stack up. This can occur when the rotor 106 and/or the gearbox shaft 108 may be radially, horizontally, or vertically misaligned prior during assembly. Excessive radial rotor runout can occur if there is an offset, for example, greater than 0.15 mm offset (>0.15 mm), horizontally or vertically from the axial center.

If assembled with axial, horizontal, or vertical misalignment greater than an allowed threshold, then the radial rotor runout can occur and potentially cause gearbox bearing damage, energy loss, excessive wear, excessive vibrations, damage to the rotor 106, the gearbox shaft 108, the gearbox 104, the generator 102, and/or to the genset assembly 100 as a whole. Misalignment would also cause a shortened life of the generator 102, the gearbox 104, and/or the genset assembly 100. The centering device 112 is provided to axially align the rotor 106 with the gearbox shaft 108, during assembly and in aftermarket repair.

Referring to FIG. 2 and FIG. 3, a perspective frontal view of the centering device 112 and a perspective side view of the centering device 112 is illustrated according to one embodiment, respectively. The centering device 112 may comprise different types of clamps. For example, the centering device 112 may be a flexible clamp, an engineered clamp, a pipe with a wraparound chain, a precision machined c-clamp, a V-block clamp, or a split clamp.

FIGS. 2 and 3 illustrate a split clamp, according to one embodiment of the centering device 112. The centering device 112 comprises a cap 200, a first leg 202, and a second leg 204. The first leg 202 and the second leg 204 may be identical. The centering device 112 also comprises a plurality of bolts 206 that connect the first leg 202 and the second leg 204 to the cap 200. When the first leg 202 and the second leg 204 are connected to the cap 200, the centering device 112 creates a hollow center 208 configured for orienting around the rotor shaft 106 and the hub retention washer 110 or the like. For example, rotors and shafts are generally of a cylindrical type. In one embodiment, the centering device 112 would form a hollow center 208 for orienting around a concentric rotor 106, a concentric gearbox shaft 108, concentric hub retention washer 110, or the like. The hollow center 208 may be of hexagonal or another shape.

The centering device 112 may have a handling slot 210 situated on one or more of the sides of the centering device 112 for using a handle to orient the centering device into position.

Referring to FIG. 4 and FIG. 5, an exploded view of the centering device 112 is illustrated in a horizontal and vertical orientation, respectively. The first leg 202 and the second leg 204 each have an at least one hole 400 in which the plurality of bolts 206 enters through and connects to the cap 200 comprising an at least one receiving slot 402 for each of the first leg 202 and the second leg 204. The at least one receiving slot 402 may comprise an O-ring 500 to receive each bolt 204 that enters between through the receiving slot 402 and connects to the cap 200, as illustrated in FIG. 5. The receiving slot 402 may be threaded to receive the bolt 204.

When the plurality of bolts 206 are tightened in each of the first leg 202 and second leg 204, the first leg 202 and second leg 204 are secured to the cap 200, respectively. The securing force around the rotor 106 and gearbox shaft 108 from tightening the plurality of bolts 206 provides a horizontal or vertical lifting force that aligns the axial centers of the rotor 106 and gearbox shaft 108 by adjusting any existing horizontal and vertical misalignment to meet a radial rotor runout target.

The centering device 112 may be made of steel, plastic, or other material suitable to handle the size of the genset assembly 100 and force the axial center of the rotor 106 to align with the hub retention washer 110 and the axial center of the gearbox shaft 108. The centering device 112 may be made of metal for increased hardened strength and to have the ability to apply an external force against 2500 lbs from the rotor side, in one embodiment. The centering device 112 is a scalable device and would be made of a chosen material suitable for its environment. The plurality of bolts 206 may be a screw type, or the like, and made of metal, plastic, or other material suitable to handle the size of the genset assembly 100 and force coaxial alignment of the rotor 106 and the gearbox shaft 108.

Figure 6:
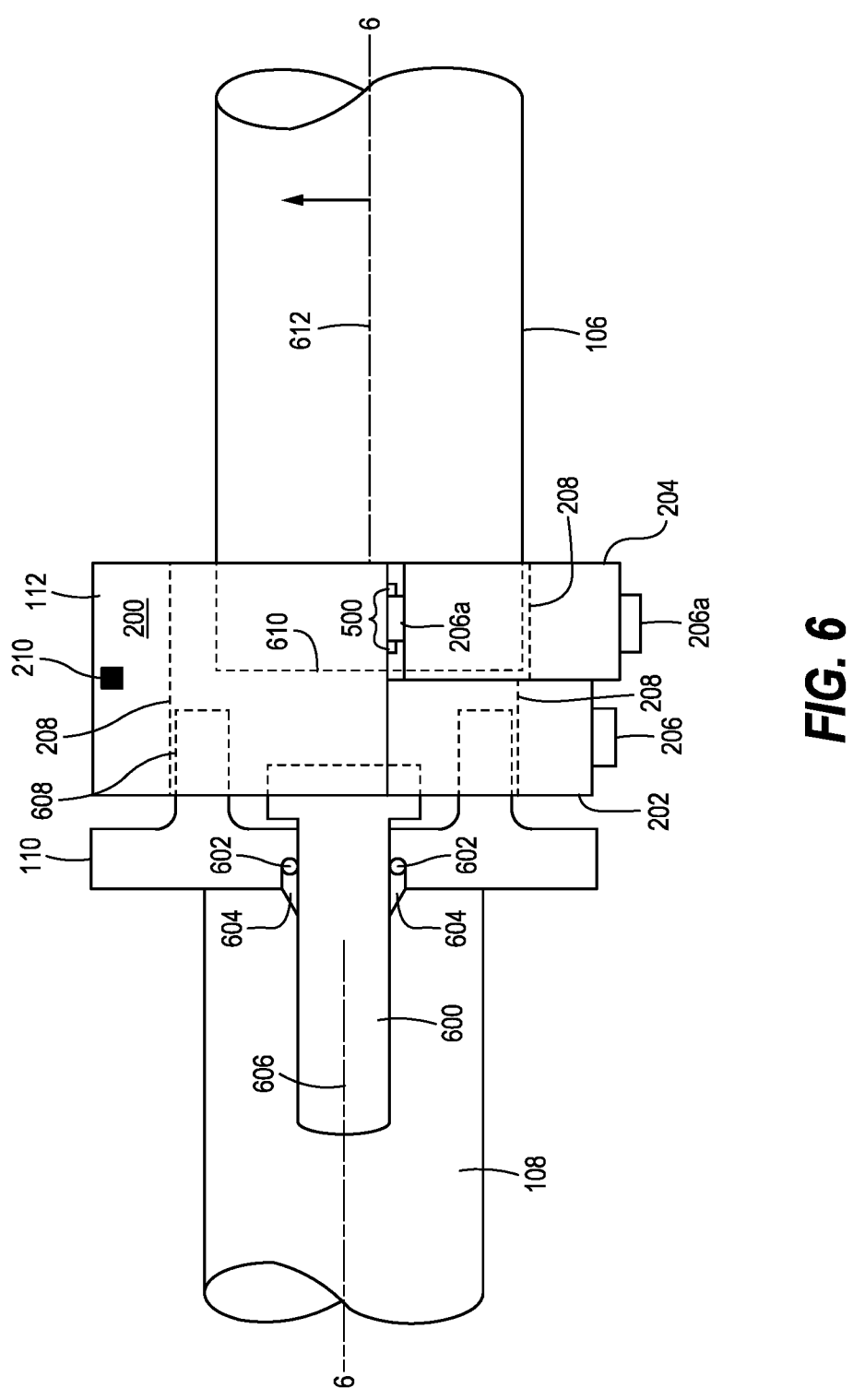
FIG. 6 is a cross-section of the centering device taken along line 6-6 and oriented on the rotor and gearbox shaft for coaxial alignment, according to an embodiment.

Referring to FIG. 6, a cross-section of the rotor 106 and gearbox shaft 108 is illustrated being aligned with the centering device 112. The hub retention washer 110 is connected to the gearbox shaft 108 by a retention bolt 600. Between the hub retention washer 116 and the retention bolt 600 is a dowel O-ring 602 and a dowel 604.

The retention bolt 600 clamps the hub retention washer 110 to the gearbox shaft 108. The dowel 604 is a concentric metallic piece with a tight precision and concentric fit to retention washer 110. Compression of dowel O-ring 602 provides axial force to center a tapered side of the dowel 604 against the machining center of the gearbox shaft 108. This locates the dowel 604 concentrically to the gearbox shaft axis 606. In turn, the hub retention washer 110 is very well aligned with the tight fit to the dowel 604. Therefore, the hub retention washer 110 is very well aligned to the axis of rotation of the gearbox shaft 108.

The hub retention washer 110 is a concentrically shaped washer having a protruding portion 608 that may act as an external feature or extension of the gearbox shaft 108 that is coaxially concentric with the gearbox shaft 108 and the gearbox axis 606. The protruding portion 608 is shown within the hollow center 208 in dashed lines in FIG. 6.

When aligning the rotor 106 and the hub retention washer 110, the cap 200 is set on top of the protruding portion 608 and an end 610 of the rotor 106. Then the first leg 202 and second leg 204 is attached in sequential steps. For example, the first leg 202 is placed against the protruding portion 608 opposite the cap 200. The second leg 204 is placed against the rotor 106 opposite the cap 200. The plurality of bolts 206 are placed into the at least one hole 400 in each the first leg 202 and the second leg 204 and connects the first leg 202 and the second leg 204 to the cap 200 separately. The plurality of bolts 206 in first leg 202 and the second leg 204 are tightened which forces the gearbox axis 606 and a rotor axis 612 to concentrically and coaxially align. The rotor axis 612 is the axis of rotation of the rotor 106. When the plurality of bolts 206 are tightened, the rotor 106 and the hub retention washer 110 are forced to center into the centering device 112.

In one embodiment, FIG. 6 shows the first leg 202 fully connected to the hub retention washer 110 and the second leg 204 including a bolt 206a requiring a force to tighten the bolt 206a so that a lifting force is exerted to force the rotor 106 to coaxially align with the gearbox axis 606. In FIG. 6, the 6-6 line is off-center and not coaxially aligned. By tightening the plurality of bolts 206, the gearbox axis 606 and rotor axis 612 are forced to coaxially align within the hollow center 208, along the 6-6 line.

Figure 7:
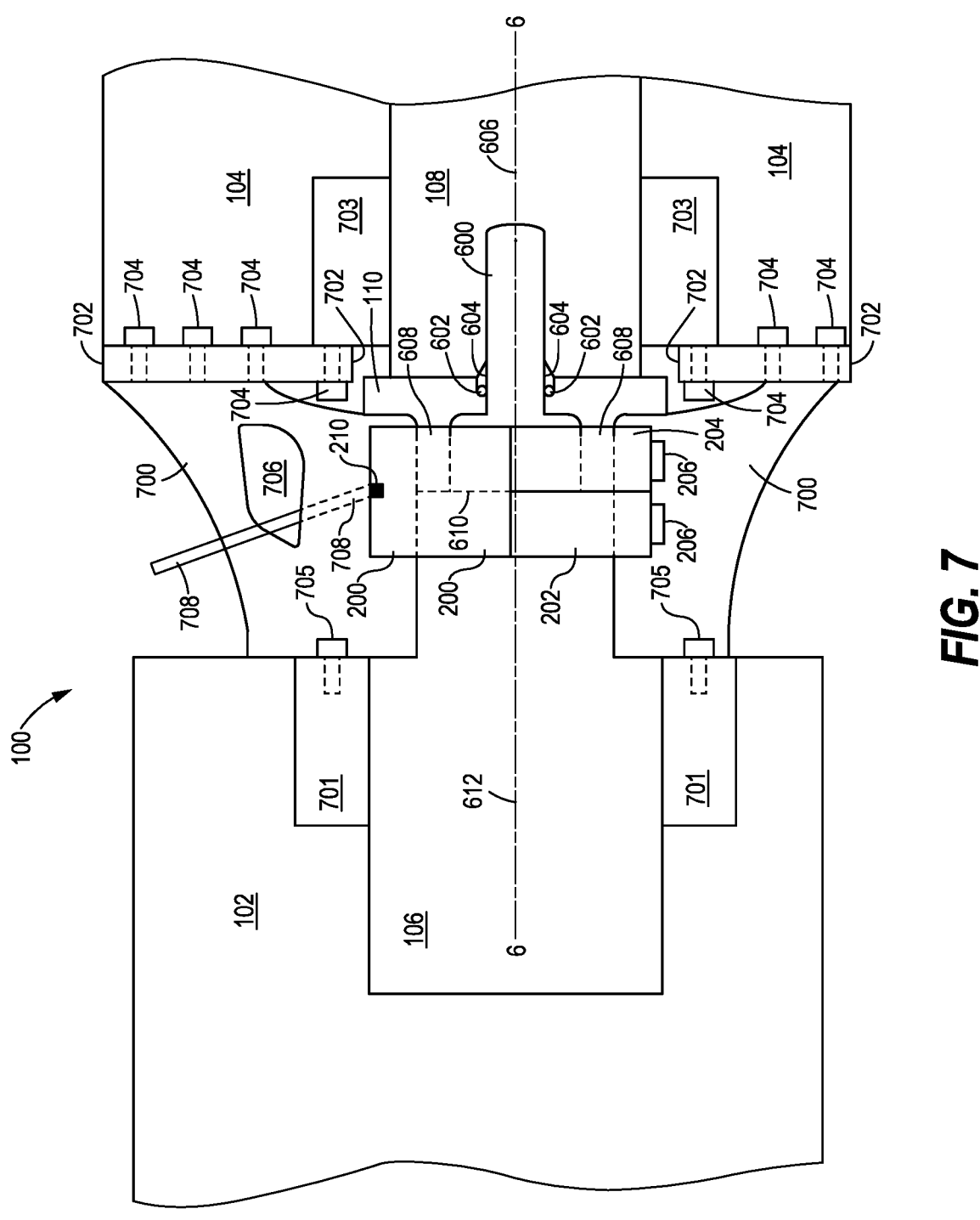
FIG. 7 is a cross-section of the centering device taken along line 6-6 in the genset assembly with the rotor and gearbox shaft coaxially aligned, according to an embodiment.

Referring to FIG. 7, the centering device 112 is shown, as a split clamp, around the rotor 106 and the hub retention washer 110 and the gearbox shaft 108 with the gearbox axis 606 and rotor axis 612 in alignment along the 6-6 line in the genset assembly 100. The alignment of the gearbox axis 606 and rotor axis 612 may be offset by a radial rotor runout target, up to 0.15 mm radial offset in one embodiment. A radial rotor runout measurement greater than 0.15 mm may cause vibrations that may damage the generator 102, the gearbox 104, the rotor 106, the gearbox shaft 108, and/or the genset assembly 100.

In one embodiment, FIG. 7 illustrates the centering device 112 around the end 610 of the rotor 106 and the protruding portion 608 of the hub retention washer 110 occurring inside a flexplate adapter 700. FIG. 7 illustrates the 6-6 line in coaxial alignment. The flexplate adapter 700 is attached to a rotor hub 701 connected to the rotor 106 by using a plurality of adapter bolts 705. The rotor hub 701 is attached to the rotor 106 by pressing the rotor hub 701 onto the rotor 106 as generally known in the arts. After the centering device 112 aligns the rotor 106 and gearbox shaft 108, a set of flex plates 702 are installed to further secure the generator rotor 106 to the gearbox shaft 108. The set of flex plates 702 are on the side of the gearbox 104 placed between the gearbox hub 703 and the flexplate adapter 700. The set of flex plates 702 are secured to the flexplate adapter 700 and the gearbox hub 703 by using a plurality of flex plate bolts 704. The set of flex plates 702 are used on only one side, either the gearbox 104 side or the generator 102 side. In another embodiment, the flexplate adapter 700 is attached to the gearbox hub 703 and the set of flex plates 702 could be placed on the side between the generator 102 and the flexplate adapter 700 where the set of flex plates 702 could be secured to the rotor hub 701.

The flexplate adapter 700 includes at least one window 706 for providing access to the interior of the flexplate adapter 700 where the centering device 112 aligns the end 610 of the rotor 106 and the hub retention washer 110. The window 706 is accessible during manufacturing assembly of the genset assembly 100 and during aftermarket repairs at repair shops, dealers, or the like.

In accordance with another embodiment of the disclosure, the centering device 112 may be designed as a V-block clamp, configured to similarly orient on the rotor 106 and the hub retention washer 110. The V-block clamp may have a hinge creating an angle less than 90 degrees. The angle feature of the v-block clamp provides a vertical lifting force towards the hinge when clamping or providing an external force that reduces the angle. The V-block comprises a pin configured to be tightened that reduces the angle of the V-block and provides the lifting force, whereby the lifting force aligns the rotor 106 with the hub retention washer 110 of the gearbox shaft 108, along the 6-6 line. The V-block should be angled with the open end in a up or down orientation to get maximum force in a direction for centering the rotor 106 and the gearbox shaft 108 during coupling.

INDUSTRIAL APPLICABILITY

In operation, the present disclosure may find applicability in many industries including, but not limited to, genset assemblies, electric and gas generator systems, engine-gearbox assemblies, single bearing generators, and the like. While the foregoing detailed description is made with specific reference to genset alignment, it is to be understood that its teachings may also be applied in engine-gearbox shaft assemblies, and the like.

The present disclosure provides a method 800, as described in FIG. 8, for coaxially or radially aligning the rotor 106 with the gearbox shaft 108 by providing the hub retention washer 110 on the gearbox shaft 108, in a step 802. The method includes orienting the centering device 112 configured to the end 610 of the rotor 106 and the protruding member 608 of the hub retention washer 110, in a step 804. The centering device 112 axially aligns the rotor 106 to the gearbox shaft 108 within the flexplate adapter 700 when the first leg 202 and second leg 204 are fully secured to the cap 200. The cap 200 can be oriented on the end 610 of the rotor 106 and the protruding portion 608 of the hub retention washer 110. The cap 200 may be oriented on the rotor 106 and hub retention washer 110 by hand or by using a handling stick 708 that connects to the handling slot 210 for orienting on the rotor 106 and the gearbox shaft 108. The cap 200 may be oriented on the rotor 106 and gearbox shaft 108 during assembly in a horizonal or vertical assembly process. The handling slot 210 may be threaded and the handling stick 708 may have a screw type end to connect to the threaded handling slot 210. The first leg 202 and second leg 204 may also have a handling slot 210 on one of its surfaces for the handling stick 708 to handle and orient within the flexplate adapter 700.

After the cap 200 is oriented on the rotor 106 and hub retention washer 110, the first leg 202 and second leg 202 are oriented around the rotor 106 and hub retention washer 110. Either the first leg 202 or second leg 204 may be positioned first. When the first leg 202 is in position, then the at least one bolt 206 is provided through the at least one hole 400 and into the at least one receiving slot 402. The O-ring 500 helps support catching and guiding the at least one bolt 200 into the at least one receiving slot 402. The first leg 202 and the second leg 204 may be pre-loaded with the at least one bolt 206 in the at least one hole 400 in the first leg 202 and the second leg 204. When the bolts 206 are tightened in the first leg 202 and the second leg 204, the first leg 202 forces the end 610 of the rotor 106 to align with the hub retention washer 110, thereby aligning the rotor axis 612 with the gearbox axis 606, in a step 806.

FIG. 7 illustrates the first leg 202 and the second leg 204 fully connected to the cap 200 wherein a lifting force is exerted against the rotor 106 to coaxially align the rotor 106 with the hub retention washer 110. By tightening the plurality of bolts 206, the rotor 106 is forced to align with the hub retention washer 110 within the hollow center 208 and align the rotor axis 612 with the gearbox axis 606. Once the rotor axis 612 aligns with the gearbox axis 606 along the 6-6 line, the flexplate adapter 700 and the set of flex plates 702 are provided to fully secure the rotor 106 and gearbox shaft 108 together in a step 808 and a step 810, respectively. The centering device 112 may then be removed from the genset assembly 110 by removing the first leg 202 and the second leg 204, in a step 812. The radial alignment of the gearbox axis 606 and rotor axis 612 is measured for a radial rotor runout target, in a step 814. The radial rotor runout can be checked by measuring the total indicated runout around the set of flex plates 702 referenced to the generator 102, or by another runout measurement that confirms alignment, generally known in the arts.

In another embodiment, a repair method 900 is disclosed using the centering device 112 to repair alignment when the rotor axis 612 becomes misaligned with the gearbox axis 606. If the rotor 106 and the gearbox shaft 108 exhibit a misalignment, where the rotor axis 612 and gearbox axis 606 are off-center, above an acceptable radial rotor runout target, then the genset assembly 100 will require repair for realigning the rotor axis 612 with the gearbox axis 606, along the 6-6 line.

In a step 902, the centering device 112 may be realigned by loosening the plurality of flex plate bolts 704 to loosen the set of flex plates 702. The set of flex plates 704 do not need to be fully removed and may be loosened enough as to allow the force of the centering device 112 to force movement of the rotor 106 to align with the gearbox shaft 108.

In a step 904, the centering device 112 is then oriented around the rotor 106 and hub retention washer 110 with the cap 200, the first leg 202, and the second leg 204, as described herein. The plurality of bolts 206 are then tightened to force the rotor 106 to coaxially align with the hub retention washer 110 so that the rotor axis 612 aligns with the gearbox axis 606 within the hollow center 208, in a step 906. In step 908, the plurality of flex plate bolts 704 are tightened to secure the set of flex plates 702 to the flexplate adapter 700 and the gearbox hub 703. The centering device 112 is then removed from the flexplate adapter 700 in step 910. In a step 912, the radial rotor runout target is measured to ensure the rotor axis 612 and gearbox axis 606 are aligned to an allowable threshold.

The centering device 112 can be a tool at an assembly factory or an aftermarket tool at a repair shop or dealer for use as a dealer specialty tool or aftermarket part.

A repair shop may purchase the centering device 112 as a tool to repair vibrational problems, i.e. radial rotor runout, that may occur in a genset assembly 100. The centering device 112 can be used, according to the method disclosed herein, to reassemble the genset assembly to remove the vibrational issues caused by radial rotor runout and misalignment of the rotor 106 and gearbox shaft 108. The method allows for aligning the rotor axis 612 with the gearbox axis 606 within an allowed tolerance without the need for a gauge measurement in manufacturing assembly and aftermarket repair.

The centering device 112 oriented around the hub retention member 110 and the rotor 106 to force co-axially alignment provides an improvement to the tolerance stack up around the torque path. The improvement in the tolerance stack-up stems from using the method disclosed herein to coaxially align the rotor axis 612 and the gearbox axis 606 along the 6-6 line.

From the foregoing, it can be seen that the technology disclosed herein has industrial applicability in a variety of settings such as, but not limited to, the assembly of connecting a generator rotor shaft to a gearbox shaft in an electric or gas genset assembly.

What is claimed is:

1. A centering device for centering a rotor shaft of a generator to a gearbox shaft of a gearbox, the centering device comprising:
   a clamp assembly configured to be oriented on the rotor shaft and the gearbox shaft, the gearbox shaft having a hub retention washer, the hub retention washer having a protruding diameter matching a diameter of the rotor, wherein the clamp assembly is configured to be oriented on the rotor shaft configured to be tightened to force the rotor shaft to radially align with the hub retention washer connected to the gearbox shaft; and
   an at least one alignment bolt configured to secure the clamp assembly around the rotor shaft and the gearbox shaft.

2. The centering device according to claim 1, further comprising:
   a cap configured to attach around both the rotor shaft and the hub retention washer;
   a first leg configured to attach around the rotor shaft and connect to the cap; and
   the second leg configured to attach around the hub retention washer and connect to the cap;
   the centering device forcing the rotor shaft to coaxially align with the gearbox shaft when the first and second leg are connected to the cap.

3. The centering device according to claim 2, the at least one alignment bolt comprising an at least one first bolt and an at least one second bolt, the cap further comprising:
   at least one bolt slot in the first leg for inserting the at least one first bolt in the first leg to connect to the set of receiving slots in the cap; and
   at least one bolt slot in the second leg for inserting the at least one second bolt in the second leg to connect to the set of receiving slots in the cap, wherein inserting the at least one first bolt and the at least one second bolt radially aligns the centers of the rotor shaft and gearbox shaft.

4. The centering device according to claim 3, the centering device further comprising a handling slot configured to connect a handle tool for handling the centering device.

5. The centering device according to claim 3, the centering device is made of set steel, metal, or plastic.

6. The centering device according claim 3, the centering device is made of steel and configured to exert a lifting force up to 2500 lbs against the rotor.

7. The centering device according to claim 2, wherein the clamp assembly may be a V-block clamp assembly, the V-block clamp assembly further comprising:
   a hinge creating a v-angle less than 90 degrees; and
   a bolt, whereby tightening the bolt reduces the v-angle and provide a centering force that aligns the rotor shaft and gearbox shaft.

8. A method of radially aligning a rotor shaft of a generator to a gearbox shaft of a gearbox, the method steps comprising:
   providing a hub retention washer connected to the gearbox shaft, the hub retention washer comprising a protruding diameter matching a front of the rotor shaft;
   orienting a centering device around the hub retention washer and the rotor shaft; and
   tightening the clamp assembly to provide a centering force until the rotor shaft and gearbox shaft are radially aligned.

9. The method according to claim 8, the steps further comprising:
   providing a flexplate adapter connected to the rotor shaft and configured to surround the gearbox shaft;
   providing a set of flex plates to secure the axial and radial position of the rotor shaft to the gearbox shaft after coupling;
   securing the set of flex plates to the flexplate adapter and a gearbox hub;
   removing the centering device; and
   measuring the radial alignment to meet a rotor runout threshold.

10. The method according to claim 9, wherein a runout rotor target is measured to be greater than an allowed threshold, the method further comprising:
   loosening the set of flex plates;
   reapplying clamp assembly to the hub retention washer and the rotor shaft within the flexplate adapter;

tightening the clamp assembly to radially align the rotor shaft and gearbox shaft;

securing the set of flex plates;

removing the centering device from the flexplate adapter; and measuring the runout rotor target.

11. The method according to claim 10, wherein the allowed threshold is 0.15 mm radially offset.

12. The method according to claim 10, the clamp assembly comprising a split clamp further comprising cap, a first leg and a second leg, wherein the cap is configured to orient around both the rotor shaft and the hub retention washer, the first leg is configured to orient around the rotor shaft and connect to the cap, the second leg configured to orient around the hub retention washer and connect to the cap; and wherein the split clamp forces the rotor shaft to coaxially align with the gearbox shaft when the first and second leg are connected to the cap.

13. The method according to claim 10, the generator is a single bearing generator.

14. A genset assembly, comprising:

a generator including a rotor;

a gearbox including a gearbox shaft and a hub retention washer on the gearbox shaft, whereby the rotor operatively coupled to rotate with the gearbox shaft; and a centering device configured around the rotor and the hub retention washer to coaxially align the rotor shaft and gearbox shaft.

15. The genset assembly according to claim 14, the gearbox further comprising a retention bolt, an O-ring, and a dowel, the retention bolt connecting the hub retention washer to a pilot hole in the axial center of the gearbox shaft, the O-ring and the dowel positioned on the retention bolt and configured to center the hub retention washer to the shaft.

16. The genset assembly according to claim 14, the centering device comprising a split clamp further comprising cap, a first leg and a second leg, wherein the cap is configured to orient around both the rotor shaft and the hub retention washer, the first leg is configured to orient around the rotor shaft and connect to the cap, the second leg configured to orient around the hub retention washer and connect to the cap; and wherein the split clamp forces the rotor shaft to coaxially align with the gearbox shaft when the first and second leg are connected to the cap.

17. The genset assembly according to claim 14, the centering device is made of steel, metal, or plastic.

18. The genset assembly according to claim 14, the centering device being capable of exerting a lifting force exerted against the rotor weighing 2500 lbs.

* * * * *